United States Patent
Kang et al.

(10) Patent No.: US 11,987,148 B1
(45) Date of Patent: May 21, 2024

(54) OPTIMAL CONTROL STRATEGY FOR A DISTRIBUTED LOW VOLTAGE SYSTEM WITH UNIDIRECTIONAL DIRECT CURRENT CONVERTERS

(71) Applicant: GM GLOBAL TECHNOLOGY OPERATIONS LLC, Detroit, MI (US)

(72) Inventors: Jun-mo Kang, Ann Arbor, MI (US); Muhammad Hussain Alvi, Troy, MI (US); Mohamed Kamel, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/168,750

(22) Filed: Feb. 14, 2023

(51) Int. Cl.
  *B60L 58/22* (2019.01)
  *H02M 3/335* (2006.01)

(52) U.S. Cl.
  CPC ......... *B60L 58/22* (2019.02); *H02M 3/33569* (2013.01); *B60L 2210/10* (2013.01); *B60L 2240/529* (2013.01); *B60L 2240/547* (2013.01)

(58) Field of Classification Search
  CPC .............. B60L 58/22; B60L 2210/10; B60L 2240/529; B60L 2240/547; H02M 3/33569
  See application file for complete search history.

(56) References Cited

U.S. PATENT DOCUMENTS

| | | | | |
|---|---|---|---|---|
| 9,485,813 | B1 * | 11/2016 | Lewis | H05B 45/44 |
| 11,865,945 | B2 * | 1/2024 | Kamel | H02M 1/007 |
| 2022/0037995 | A1 * | 2/2022 | Usami | H02M 3/33576 |
| 2023/0168284 | A1 * | 6/2023 | Alvi | B60L 53/305 |
| | | | | 324/126 |
| 2023/0226915 | A1 * | 7/2023 | Alvi | B60L 3/0069 |
| | | | | 307/10.7 |
| 2023/0264598 | A1 * | 8/2023 | Kang | B60L 58/19 |
| | | | | 320/117 |

(Continued)

FOREIGN PATENT DOCUMENTS

| | | | | |
|---|---|---|---|---|
| CN | 105730261 | A * | 7/2016 | B60L 58/12 |
| CN | 105811771 | B * | 10/2018 | |
| DE | 102007033720 | A1 * | 1/2008 | B60L 1/003 |

(Continued)

*Primary Examiner* — Adam D Houston
(74) *Attorney, Agent, or Firm* — CANTOR COLBURN LLP (57) ABSTRACT

An optimal control strategy for a distributed low voltage system with unidirectional DC/DC converters is provided. DC/DC converters regulate high electrical voltages from high voltage battery modules and output regulated electrical currents to a low voltage battery. A control system differentially varies electrical currents input to the DC/DC converters to balance states of charge in high voltage battery modules, by: calculating sets of electrical currents that balance states of charge in high voltage battery modules based on values for a low voltage regulator electrical current, in advance to knowing a value for the low voltage regulator electrical current, interpolating the sets of electrical currents to be input to the DC/DC converters in response to receiving the value for low voltage regulator electrical current, and selecting an interpolated set of the electrical currents from the sets as input to the DC/DC converters in accordance with the value received.

20 Claims, 7 Drawing Sheets

(56) References Cited

U.S. PATENT DOCUMENTS

2023/0398903 A1* 12/2023 Kamel .................. H02M 7/537

FOREIGN PATENT DOCUMENTS

| JP | 2004015992 A | * | 1/2004 | |
|----|--------------|---|--------|--|
| WO | WO-2020070167 A1 | * | 4/2020 | ............... G05F 1/08 |
| WO | WO-2020193466 A1 | * | 10/2020 | ............. B60L 1/006 |
| WO | WO-2022243177 A1 | * | 11/2022 | |

* cited by examiner

OPTIMAL CONTROL STRATEGY FOR A DISTRIBUTED LOW VOLTAGE SYSTEM WITH UNIDIRECTIONAL DIRECT CURRENT CONVERTERS

INTRODUCTION

The disclosure relates to power control systems for a vehicle, and more particularly to providing an optimal control strategy for a distributed low voltage system with unidirectional direct current (DC) converters.

In general, vehicles include many different electrical systems. These electrical systems include, but are not limited to, infotainment systems, lighting systems, power steering systems, power braking system, driver assistance systems, various sensors, heating and air conditioning systems, and the like. Many of these electrical systems operate on a low voltage (i.e., 12 volts (V)) bus that traditionally receives power from a low voltage battery.

Recently, electric and hybrid vehicles have been developed which include high voltage (i.e., >400V) battery packs and it is desirable to power the low voltage bus with the high voltage battery pack.

SUMMARY

In one exemplary embodiment, a vehicle system is provided. The vehicle system includes a direct current to direct current (DC/DC) converters configured to regulate high electrical voltages from high voltage battery modules and output regulated electrical currents to a low voltage battery. The vehicle system includes a control system coupled to the DC/DC converters, the high voltage battery modules, and the low voltage battery, where the control system is configured to differentially vary electrical currents input to the DC/DC converters in order to balance states of charge in the high voltage battery modules. The control system is configured to calculate sets of the electrical currents that balance the states of charge in the high voltage battery modules based on a plurality of values for a low voltage regulator electrical current, in advance to knowing a value for the low voltage regulator electrical current. The control system is configured to interpolate the sets of the electrical currents to be input to the DC/DC converters in response to receiving the value for the low voltage regulator electrical current, the value received being one of the plurality of values. The control system is configured to in response to interpolating, selecting an interpolated set of the electrical currents from the sets of the electrical currents as input to the DC/DC converters in accordance with the value received, thereby causing the DC/DC converters to output the regulated electrical currents to the low voltage battery.

In addition to the one or more features described herein above, the control system is configured to cause the DC/DC converters to differentially draw the electrical currents from the high voltage battery modules in order to balance the states of charge in the high voltage battery modules.

In addition to the one or more features described herein above, the control system differentially varies the regulated electrical currents output from the DC/DC converters to balance the states of charge in the high voltage battery modules based on the value of the low voltage regulator electrical current.

In addition to the one or more features described herein above, the control system is configured to select the interpolated set of the electrical currents according to the value of the low voltage regulator electrical current based on interpolating the sets of the electrical currents at the value in order to find the interpolated set, in response to receipt of the value for the low voltage regulator electrical current.

In addition to the one or more features described herein above, the control system is configured to use a known optimal solution to dictate the sets of the electrical currents for the DC/DC converters based on the plurality of values for the low voltage regulator electrical current, prior to receipt of the value for the low voltage regulator electrical current.

In addition to the one or more features described herein above, the control system is configured to balance the states of charge for the high voltage battery modules by individually changing the electrical currents drawn from the high voltage battery modules through the DC/DC converters according to the known optimal solution and the value of the low voltage regulator electrical current.

In addition to the one or more features described herein above, the control system is configured to receive the value of the low voltage regulator electrical current from a low voltage regulator.

In one exemplary embodiment, a method for a vehicle is provided. The method includes a calculating sets of electrical currents that balance states of charge in high voltage battery modules based on a plurality of values for a low voltage regulator electrical current, in advance to knowing a value for the low voltage regulator electrical current. The method includes interpolating the sets of the electrical currents in response to receiving the value for the low voltage regulator electrical current, the value received being one of the plurality of values. Also, the method includes in response to interpolating, selecting an interpolated set of the electrical currents from the sets of the electrical currents as input to direct current to direct current (DC/DC) converters in accordance with the value received, thereby causing the DC/DC converters to output the regulated electrical currents to a low voltage battery.

In addition to the one or more features described herein above, the method further includes differentially varying the regulated electrical currents output from the DC/DC converters to the low voltage battery by differentially drawing the interpolated set of the electrical currents from the high voltage battery modules in order to balance the states of charge in the high voltage battery modules.

In addition to the one or more features described herein above, the method further includes differentially varying the regulated electrical currents output from the DC/DC converters to the low voltage battery in order to balance the states of charge in the high voltage battery modules based on the value of the low voltage regulator electrical current.

In addition to the one or more features described herein above, the method further includes selecting the interpolated set of the electrical currents to be input to the DC/DC converters according to the value of the low voltage regulator electrical current based on interpolating the sets of the electrical currents at the value in order to find the interpolated set, in response to receipt of the value for the low voltage regulator electrical current.

In addition to the one or more features described herein above, the method further includes using a known optimal solution to generate the sets of the electrical currents for the DC/DC converters based on the plurality of values for the low voltage regulator electrical current, prior to receipt of the value for the low voltage regulator electrical current.

In addition to the one or more features described herein above, the method further includes balancing the states of charge for the high voltage battery modules by individually changing the electrical currents drawn from the high voltage battery modules through the DC/DC converters according to the known optimal solution and the value of the low voltage regulator electrical current.

In addition to the one or more features described herein above, the value of the low voltage regulator electrical current is received from a low voltage regulator.

In one exemplary embodiment, a vehicle system is provided. The vehicle system includes a memory having computer readable instructions, and a processing device for executing the computer readable instructions, the computer readable instructions controlling the processing device to perform a method. The method incudes calculating sets of electrical currents that balance states of charge in high voltage battery modules based on a plurality of values for a low voltage regulator electrical current, in advance to knowing a value for the low voltage regulator electrical current. The method includes interpolating the sets of the electrical currents in response to receiving the value for the low voltage regulator electrical current, the value received being one of the plurality of values. The method includes in response to interpolating, selecting an interpolated set of the electrical currents from the sets of the electrical currents as input to direct current to direct current (DC/DC) converters in accordance with the value received, thereby causing the DC/DC converters to output the regulated electrical currents to a low voltage battery.

In addition to the one or more features described herein above, the processing device is configured to perform the method further including differentially varying the regulated electrical currents output from the DC/DC converters to the low voltage battery by differentially drawing the interpolated set of the electrical currents from the high voltage battery modules in order to balance the states of charge in the high voltage battery modules.

In addition to the one or more features described herein above, the processing device is configured to perform the method further including differentially varying the regulated electrical currents output from the DC/DC converters to the low voltage battery in order to balance the states of charge in the high voltage battery modules based on the value of the low voltage regulator electrical current.

In addition to the one or more features described herein above, the processing device is configured to perform the method further including selecting the interpolated set of the electrical currents to be input to the DC/DC converters according to the value of the low voltage regulator electrical current based on interpolating the sets of the electrical currents at the value in order to find the interpolated set, in response to receipt of the value for the low voltage regulator electrical current.

In addition to the one or more features described herein above, the processing device is configured to perform the method further including using a known optimal solution to generate the sets of the electrical currents for the DC/DC converters based on the plurality of values for the low voltage regulator electrical current, prior to receipt of the value for the low voltage regulator electrical current.

In addition to the one or more features described herein above, the processing device is configured to perform the method further including balancing the states of charge for the high voltage battery modules by individually changing the electrical currents drawn from the high voltage battery modules through the DC/DC converters according to the known optimal solution and the value of the low voltage regulator electrical current.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As discussed above, high voltage (i.e., >400V) battery packs have recently been added to both electric and hybrid vehicles and it is desirable to power a low voltage bus of these vehicles with the high voltage battery pack. In order to provide low voltage power from a high voltage battery pack, a voltage regulator is needed. In general, voltage regulators, such as DC/DC converters require controllers to operate the DC/DC converters.

Exemplary embodiments provide multiple unidirectional DC/DC converters in a distributed low voltage system, which are coordinated through an optimal controller that employs a mathematical model of the low voltage system. The controller minimizes the state of charge balancing errors while meeting strict constraints to avoid any potential issues with the high voltage battery modules and DC/DC converters in real time. Exemplary embodiments extend the range of the vehicle by state of charge balancing.

According to exemplary embodiments, technical solutions may include automatic control of the distributed low voltage system with control knobs, real-time constraints on current control to avoid potential issues with the low voltage system, and active state of charge balancing through optimal distribution of current commands to DC/DC converters.

Exemplary embodiments can minimize coupling between a model predictive control (MPC) and low-level control of the low voltage regulator, provide MPC constraint change for optimal efficiency current adjustment, and provide MPC weight change for load division between the DC/DC converters.

Figure 1:
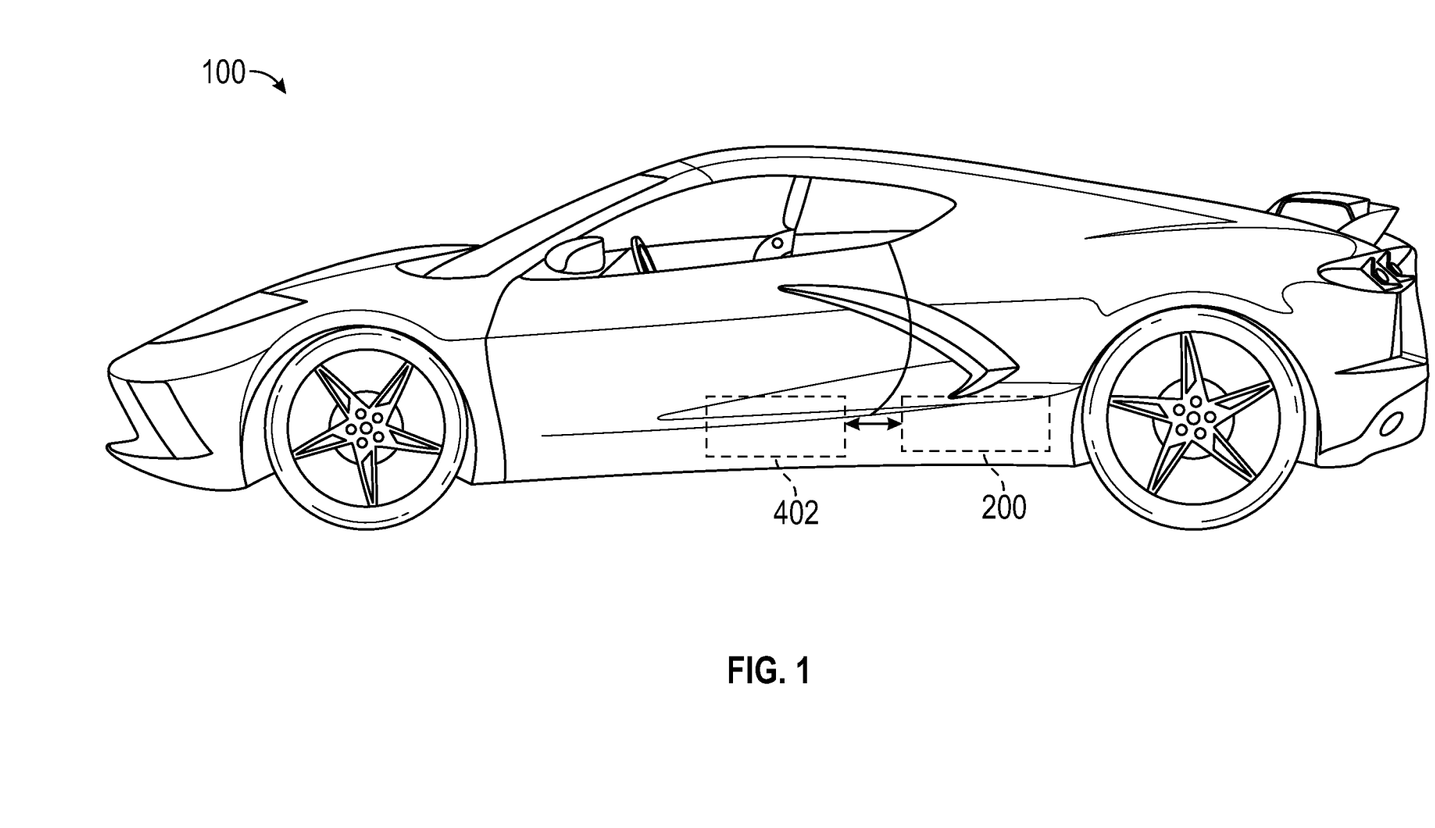
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a power supply system 200. In one embodiment, the vehicle 100 is a hybrid vehicle that utilizes both an internal combustion engine and an electric motor drive system. In another embodiment, the vehicle 100 is one of an electric vehicle propelled only by an electric motor or multiple electric motors. In another embodiment, the vehicle 100 is of conventional type and propelled by an internal combustion engine.

Electric vehicles (EVs) such as battery electric vehicles (BEVs), hybrid vehicles, and/or fuel cell vehicles include one or more electric machines and a high-voltage battery pack. A power control system 402 is used to control charging and/or discharging of the high-voltage battery system. The power control system includes an accessory power module (APM) that is configured to provide low-voltage power to one or more electrical systems of the vehicle.

Figure 2A:
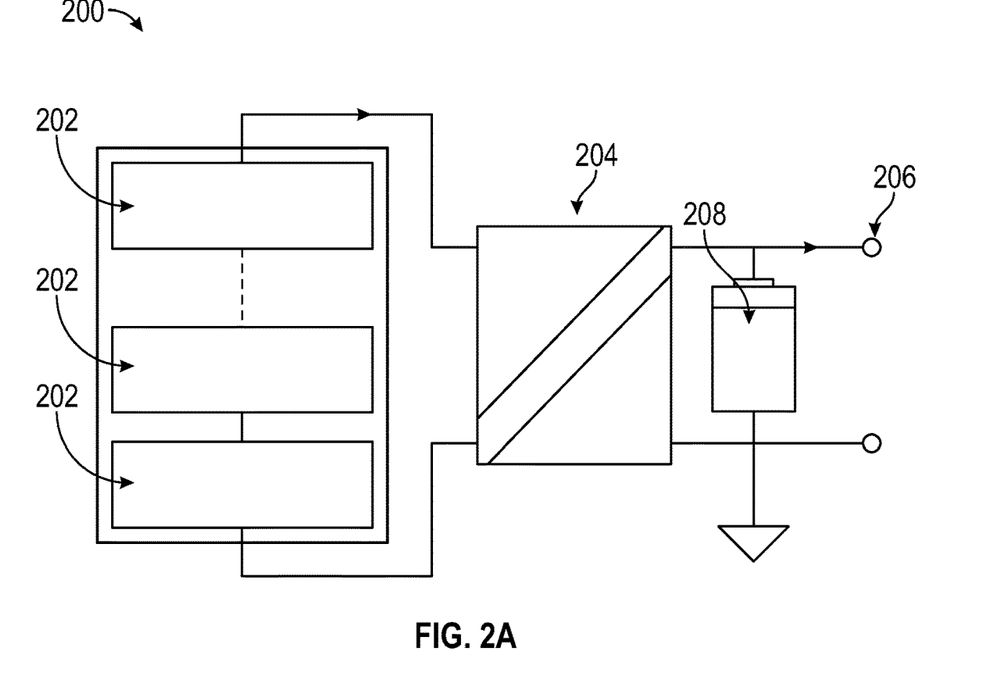
FIG. 2A is a block diagram illustrating a portion of a power supply system for a vehicle in accordance with an exemplary embodiment.

Referring now to FIG. 2A, a block diagram illustrating a portion of power supply system 200 for a vehicle in accordance with an exemplary embodiment is shown. The power supply system 200 includes a plurality of high voltage battery modules 202 that are connected in series to form a high voltage battery pack. The high voltage battery pack is connected to a DC/DC converter 204 that is configured to provide a reduced, or low voltage, to a low voltage bus 206. In exemplary embodiments, the power supply system 200 also includes a low voltage battery 208 that is also connected to the low voltage bus 206.

Figure 2B:
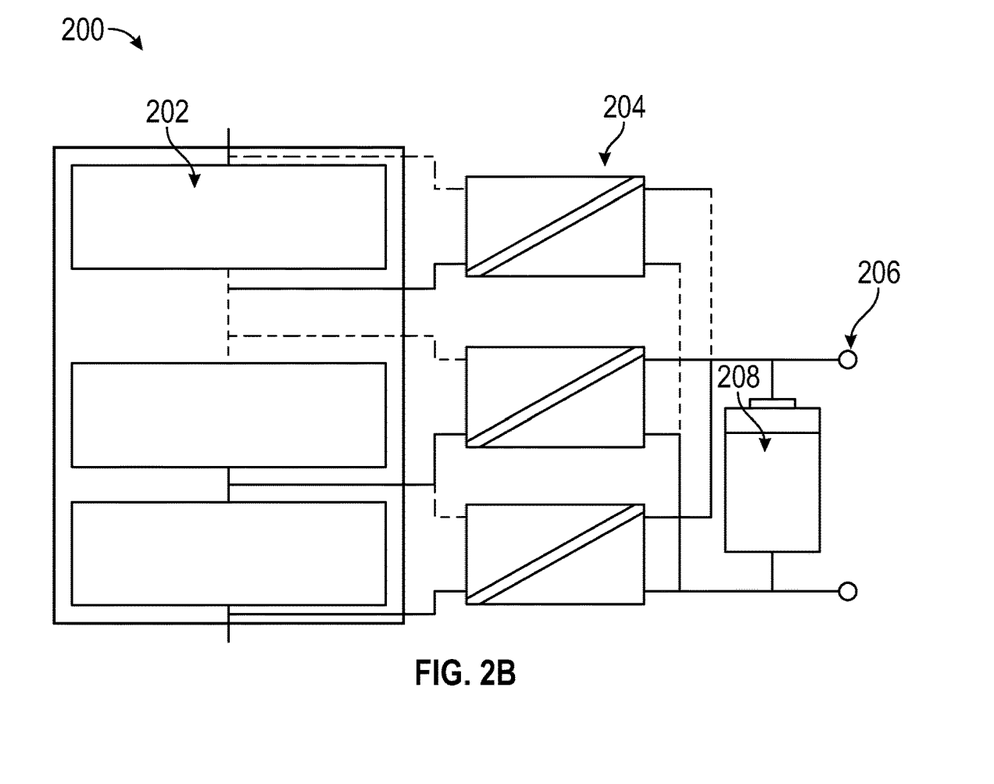
FIG. 2B is a block diagram illustrating a portion of a power supply system for a vehicle in accordance with another exemplary embodiment.

Referring now to FIG. 2B, a block diagram illustrating a portion of a power supply system 200 for a vehicle in accordance with another exemplary embodiment is shown. The power supply system 200 includes a plurality of high voltage battery modules 202 that are connected in series to form a high voltage battery pack. Each high voltage battery module 202 is connected to a separate DC/DC converter 204 that is configured to provide a reduced, or low voltage, to a low voltage bus 206. In exemplary embodiments, the power supply system 200 also includes a low voltage battery 208 that is also connected to the low voltage bus 206. In exemplary embodiments, each of the DC/DC converters 204 are connected to one another in parallel.

Figure 3:
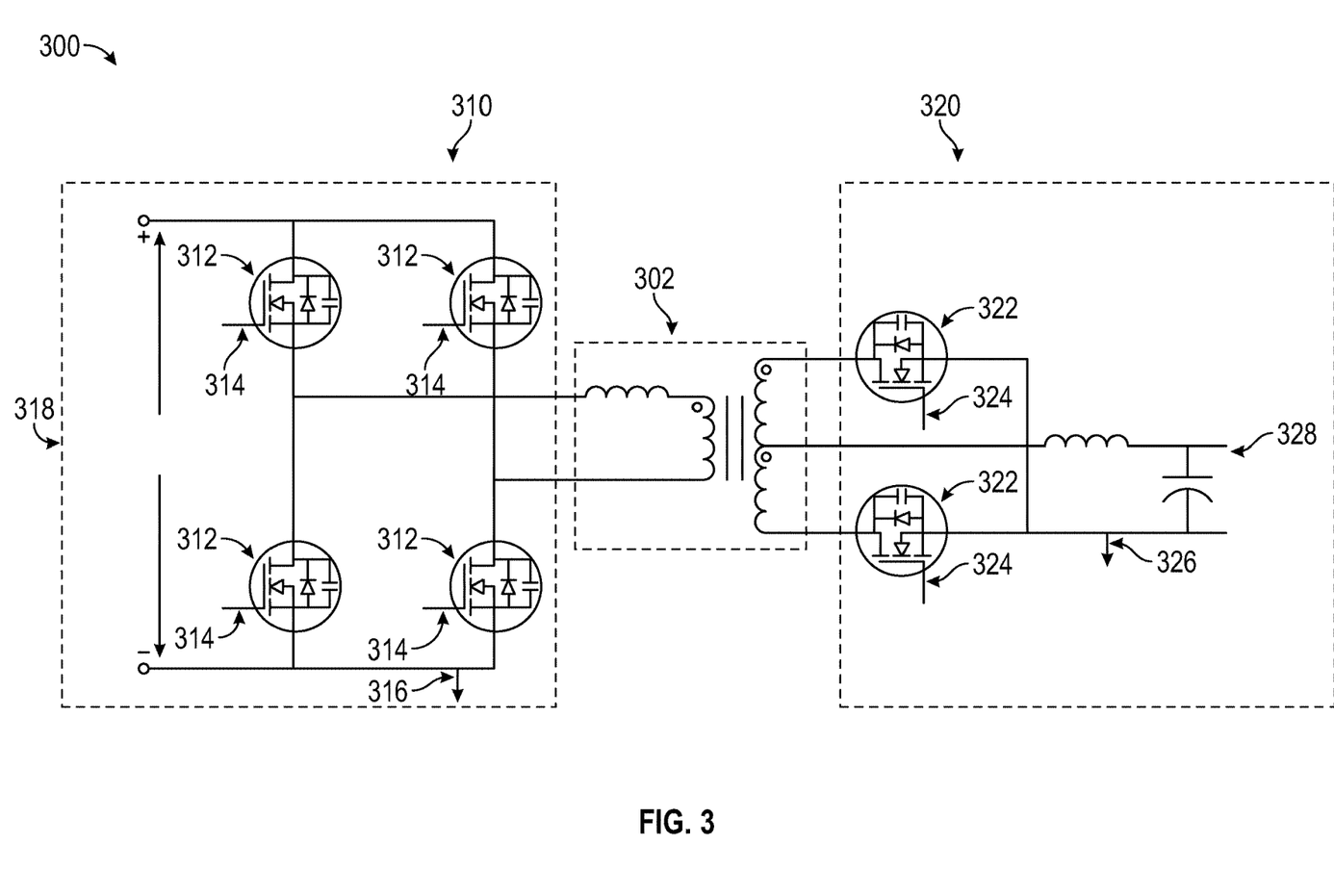
FIG. 3 is a schematic illustrating an isolated power converter in accordance with an exemplary embodiment.

In exemplary embodiments, the DC/DC converters of the power supply system 200 are isolated converters, (i.e., there is no direct conduction path between two parts of the circuit). The isolation will present a barrier between the input stage and the output stage. Isolation can be created by incorporating a transformer in the circuit so that power is transferred using electromagnetic energy. FIG. 3 is a schematic illustrating an isolated power converter 300 in accordance with an exemplary embodiment. The isolated power converter 300 is configured to receive an input voltage 318, which may be a high voltage in excess of approximately 400 Volts and to provide an output voltage 328, which may be a low voltage of approximately 48 Volts or less.

The isolated power converter 300 includes an input stage 310, also referred to as a primary stage, and an isolated or output stage 320, also referred to as an isolated stage. The input stage 310 includes a primary ground 316 that is separate from an isolated ground 326 of the isolated or output stage 320. The isolated power converter 300 includes a transformer 302 configured to transfer power from the primary stage 310 to the isolated or output stage 320. As illustrated, the primary stage 310 includes a plurality of transistors 312 that are controlled by applying bias signals 314 to the gate of the transistors 312. Likewise, the isolated or output stage 320 includes a plurality of transistors 322 that are controlled by applying bias signals 324 to the gate of the transistors 322. In exemplary embodiments, the bias signals 314, 324 are used to control the output voltage 328 of the isolated power converter 300.

Figure 4:
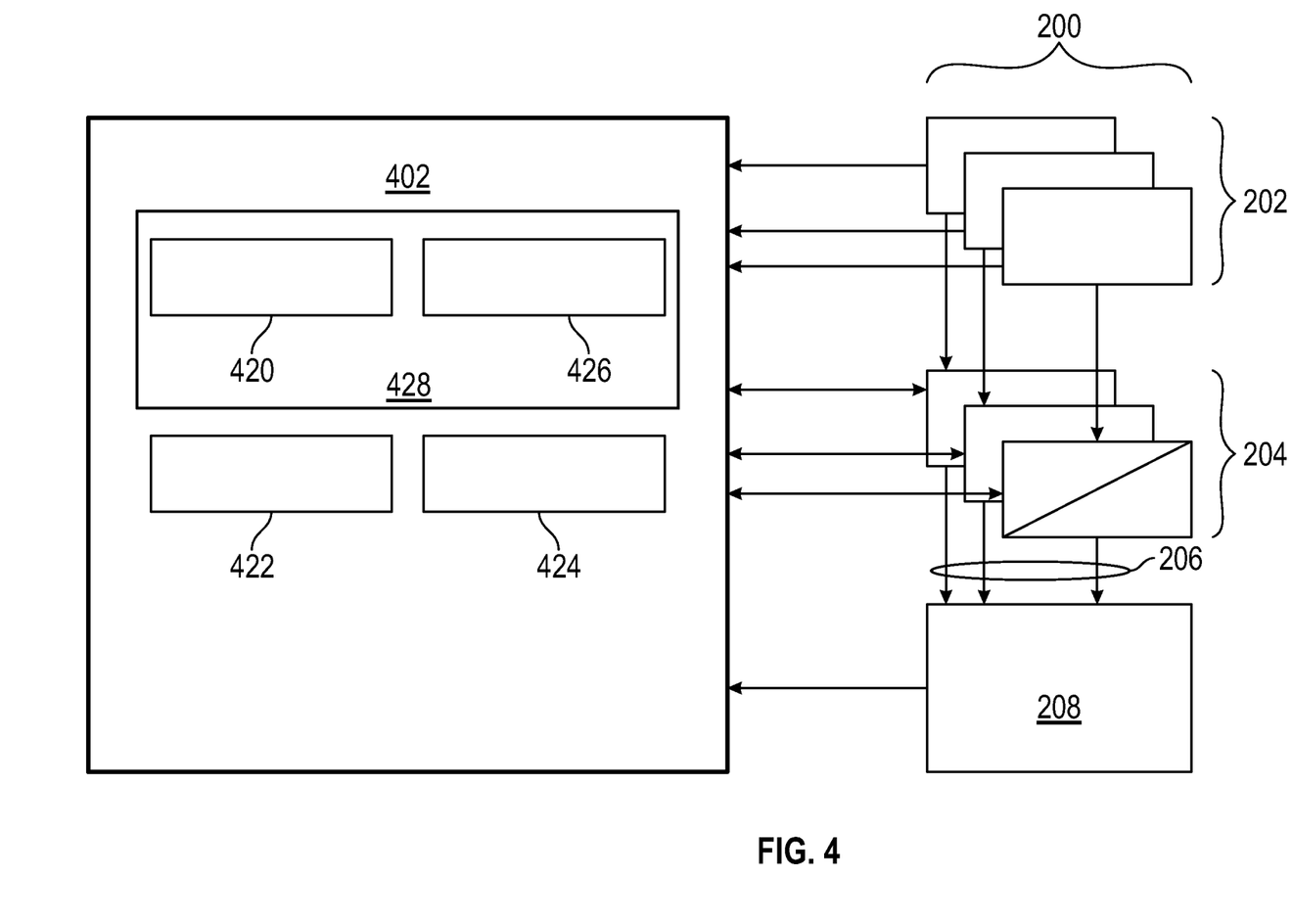
FIG. 4 is a block diagram illustrating a power supply system connected to a control system in accordance with an exemplary embodiment.

Referring now to FIG. 4, a block diagram illustrating the power supply system 200 connected to the control system 402 in accordance with an exemplary embodiment is shown. The power supply system 200 includes unidirectional DC/DC converters 204 configured to individually convert a high voltage of each high voltage battery module 202 to a low voltage on the low voltage bus 206, thereby regulating electrical current flow from the high voltage battery modules 202 on the low voltage bus 206 for the low voltage battery 208.

The control system 402 includes a model predictive control (MPC) 420, a high voltage model 422, a low voltage regulator 424, and a controller 428. The controller 428 includes the MPC 420 and a real-time interpolator 426. The control system 402 is configured to control the unidirectional DC/DC converters 204 in a distributed low voltage system by employing a mathematical model of the power supply system 200. The control system 402 minimizes the state of charge (SOC) balancing errors while meeting strict constraints to avoid any potential issues with high voltage battery modules 202 and the DC/DC converters 204 in real-time. Each high voltage battery module 202 has a state of charge that is the level of charge relative to its capacity. In the control system 402, the MPC 420 is configured to optimally distribute low currents of the DC/DC converters 204 to minimize a state of charge imbalance with strict constraints for malfunction avoidance to the high voltage battery modules 202 and the DC/DC converters 204. In other words, when the high voltage battery modules 202 have different states of charge, the control system 402 works to balance the states of charge for each high voltage battery module 202 to be the same or nearly the same.

Any of the modules in the control system 402, including the MPC 420, the high voltage model 422, the controller 428, the low voltage regulator 424, and the real-time interpolator 426, can be implemented as instructions stored on a computer-readable storage medium, as hardware modules, as special-purpose hardware (e.g., application specific hardware, application specific integrated circuits (ASICs), as embedded controllers, hardwired circuitry, etc.), and/or as some combination or combinations of these. In examples, the modules can be a combination of hardware and programming. The programming can be processor executable instructions stored on a tangible memory, and the hardware can include processing circuitry (e.g., processors) for executing those instructions. Thus, a system memory can store program instructions that when executed by processing circuitry implement the modules described herein. Alternatively, or additionally, the modules can include dedicated hardware, such as one or more integrated circuits, Application Specific Integrated Circuits (ASICs), Application Specific Special Processors (ASSPs), Field Programmable Gate Arrays (FPGAs), and/or any combination of the foregoing examples of dedicated hardware, for performing the techniques described herein.

Figure 8:
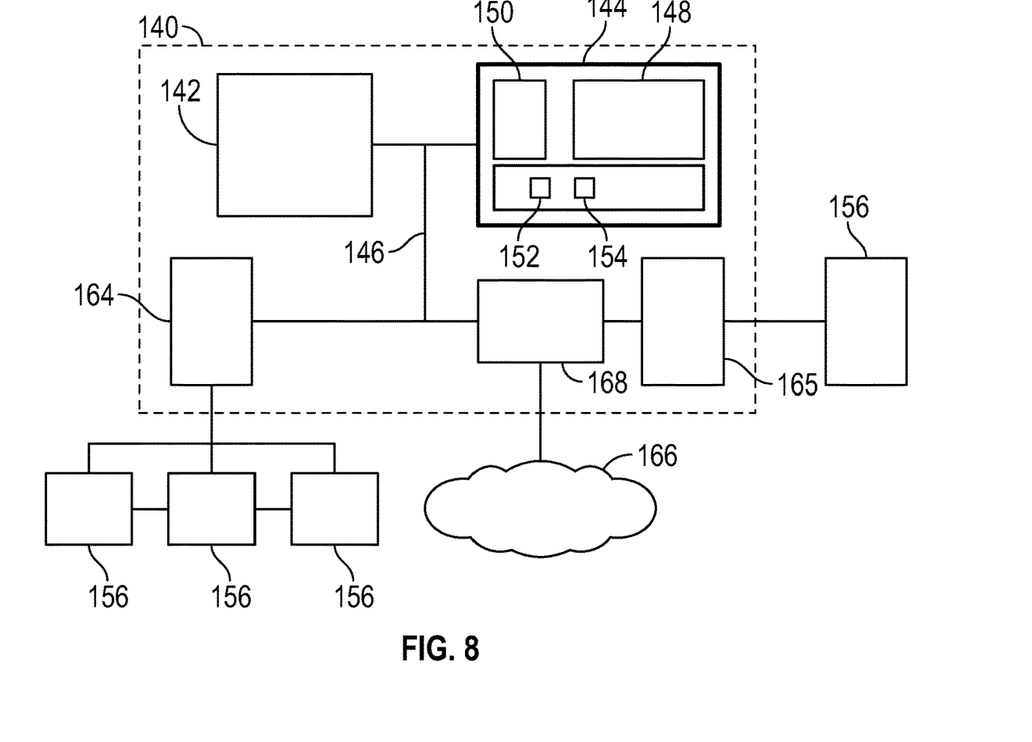
FIG. 8 depicts a computer system used to implement features discussed herein in accordance with an exemplary embodiment.

The control system 402 can include any of the functionality including software and hardware components discussed in a computer 140 depicted in FIG. 8 and discussed further herein.

Figure 5:
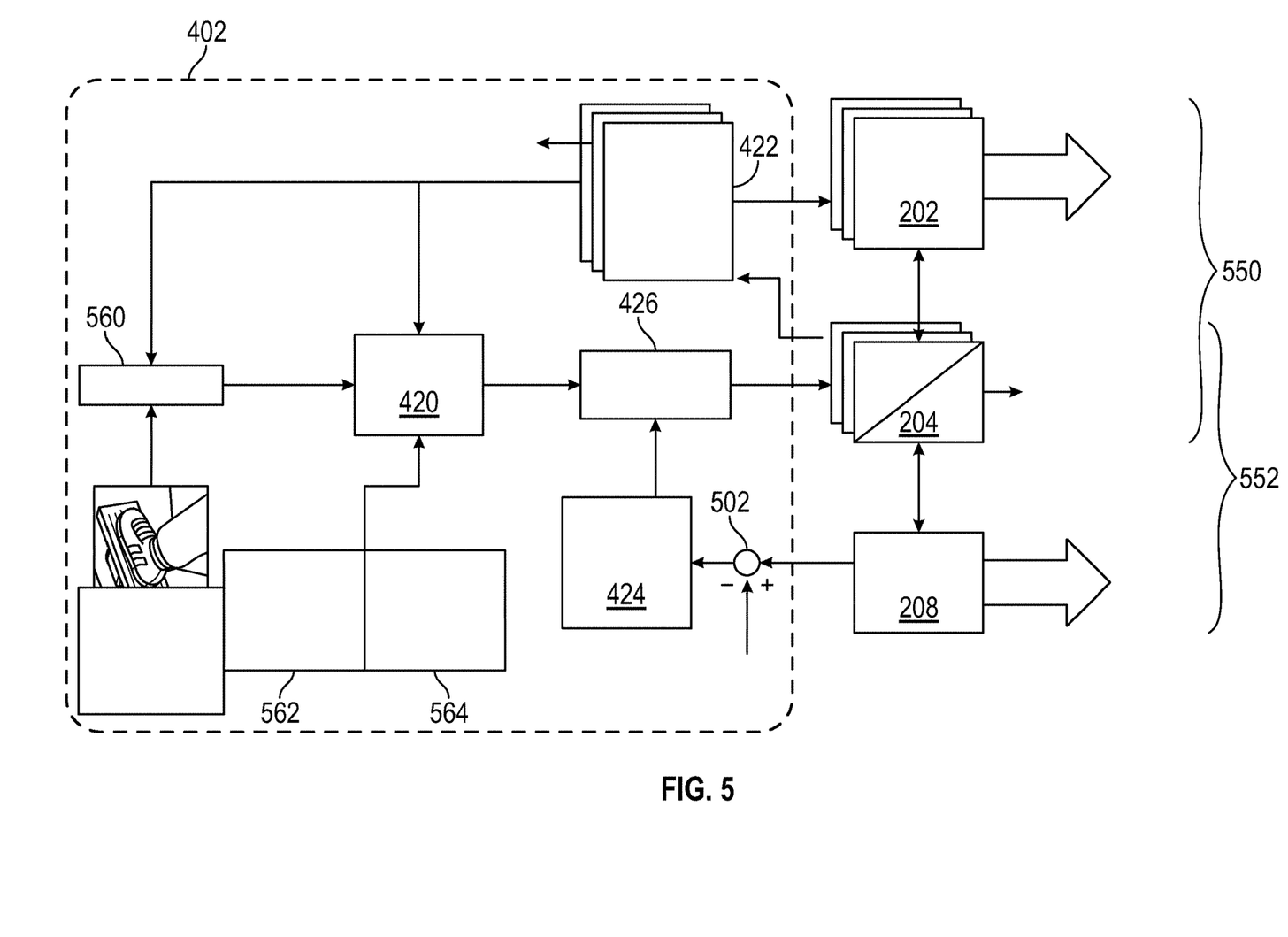
FIG. 5 is a block diagram illustrating operations of a control system to control DC/DC converters in accordance with an exemplary embodiment.
Figure 6:
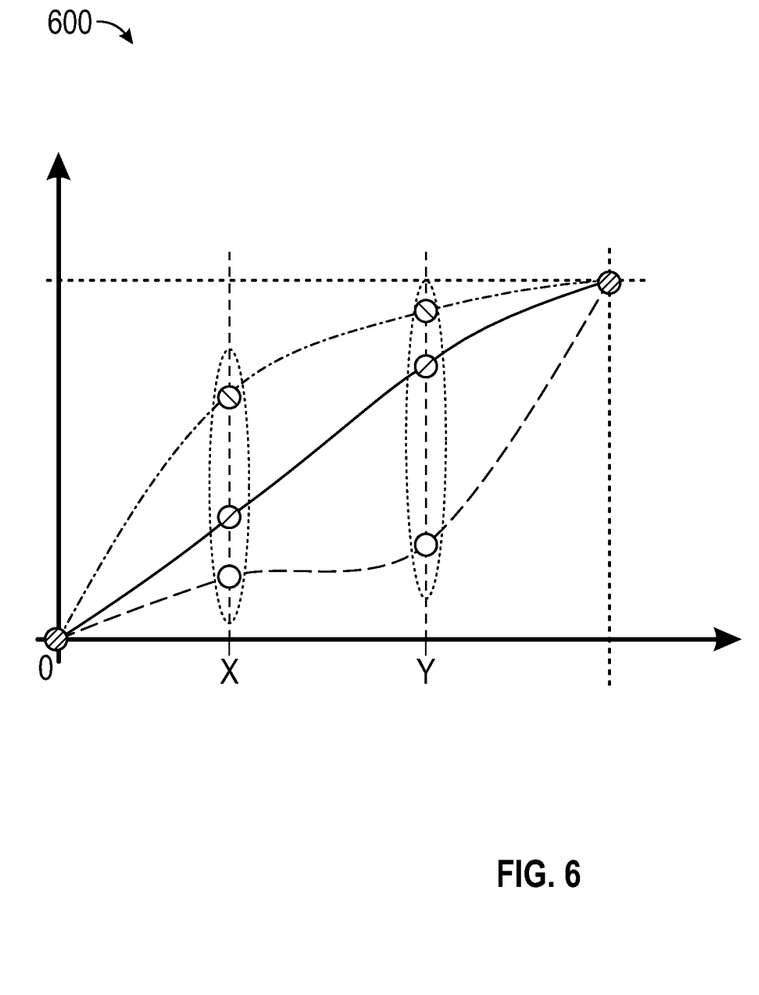
FIG. 6 is a graph illustrating optical solutions of high electrical currents that balance states of charges for high voltage battery models based on various low voltage regulator currents in accordance with an exemplary embodiment.

FIG. 5 is a block diagram illustrating operations of the control system 402 to control the DC/DC converters 204 to balance the states of charge for the high voltage battery modules 202 in accordance with an exemplary embodiment. The MPC 420 optimally distributes low currents of DC/DC converters 204 to minimize a state of charge imbalance among with high voltage battery modules 202 with strict constraints for malfunction avoidance. The control system 402 can cause the DC/DC converters to draw different currents from the respective high voltage battery modules 202 so as to each provide different currents to the low voltage battery 208, until the states of charge equalize for the high voltage battery modules 202. FIG. 5 illustrates a slow loop 550 including the MPC 420 and the HV model 422. A fast loop 552 includes the low voltage regulator 424, the real-time interpolator 426, the DC/DC converters 204, the low voltage battery 208 and the summation 502. In the fast loop 552, the low voltage regulator 424 provides an output faster than the MPC 420 can provide its output. Accordingly, the MPC 420 provides a known optimal solution that includes various values of the current for the desired states of charge for the high voltage battery modules 202, such that the real-time interpolator 426 can interpolate the current for the desired states of charge for the high voltage battery modules 202 that corresponds to the low voltage regulator current as depicted in FIG. 6.

In FIG. 5, the MPC 420 is an advanced method of a process control that is used to control a process while satisfying a set of constraints. The models used in MPCs are generally intended to represent the behavior of a complex dynamical system. In the MPC 420, physics and mathematical based models are used to model the power supply system 200 along with inputs from various constraints from constraint box 560, inputs from thermal and electrical models 562 for the DC/DC converters 204, and input of an optimal efficiency point 564.

The MPC 420 is configured to receive from the high voltage models 422 voltages and states of charge of each of the high voltage battery modules 202. The high voltage model 422 is a model configured as a high voltage state of charge observer and a high voltage state of power prediction. The high voltage models 422 output the state of charge, the state of power, and the voltages of the high voltage battery modules 202, respectively. Also, the high voltage model 422 outputs the load current $i_{HV}(t)$ shared by each of the high voltage battery modules 202, along with a maximum current $i_j^{max}$, and a minimum current $i_j^{min}$ for each high voltage battery module 202, where the subscript "j" is from 1 to N for the number of DC/DC converters 204 which equals the number of high voltage battery modules 202. Each high voltage battery module 202 has its own high voltage model 422 and its own DC/DC converter 204. For each high voltage battery module 202, the high voltage models 422 receives the load current $i_{HV}(t)$, temperature, and $V_j(t)$, where $V_j(t)$ is the voltage at an individual DC/DC converter on the high side.

Referring to FIG. 5, the constraint box 560 can be a data structure in memory (e.g., system memory 144 in FIG. 8) associated with one or more algorithms for processing input and providing output to the MPC 420. The constraint box 560 is coupled to the high voltage models 422 to receive a load current $i_{HV}(t)$, the maximum current $i_j^{max}$, and the minimum $i_j^{min}$ for each high voltage battery module 202.

The constraint box 560 also receives the operation of the throttling by the DC/DC converters 204. As the output from the constraint box 560, the MPC 420 receives a maximum current $i_{DC}^{max}$ of the DC/DC converters 204 along with a maximum current $i_{ij}^{max}$ and a minimum current $i_{ij}^{min}$ of the $j^{th}$ DC/DC converter 204, respectively. The $i_{DC}^{max}$ is the maximum current of the DC/DC converter 204 that is allowed, such that if the maximum current of all DC/DC converters 204 were equal, then maximum current $i_{ij}^{max}$=maximum current $i_{DC}^{max}$. As a reference, it is noted that the subscript "i" denotes "individual" such that $i_i$ is an individual DC converter "#i" current.

The MPC 420 is configured to output an intermediate current command $i_{ij}^{des}$ for each individual DC/DC converter 204 to the real-time interpolator 426 in preparation for interpolation. Using a set of intermediate low voltage regulator current $i_{LV}^{reg}$ from the low voltage regulator 424, the MPC 420 calculates numerous values for the high voltage current that needs to be drawn from the high voltage battery modules 202, because the actual value for the low voltage regulator is not known. Particularly, the real-time interpolator 426 takes the set of intermediate current commands $i_{ij}^{des}$ for each individual DC/DC converter 204 and interpolates for a given $i_{LV}^{reg}$ in order to determine the actual current for each individual DC/DC converter 204. For example, $i_{ij}^{des,final}$ is the current command for $j^{th}$ DC converter to achieve the given $i_{LV}^{reg}$. As discussed further herein, the MPC 420 uses the set of intermediate $i_{LV}^{reg}$ from a grid over the actual range of $i_{LV}^{reg}$ to obtain the optimal solution of the currents that need to flow through each of the DC/DC converters 204 for state of charge balancing. That is, each individual DC/DC converter 204 needs its own current command for state of charge balancing of the high voltage battery modules 202, and the MPC 420 optimally determines these current commands, and therefore amplitudes, for various values of the low voltage regulator current in advance. In the example scenario in FIG. 6, there are three currents for each potential value of the low voltage regulator command in order for the real-time interpolator 426 to select from the various sets of three individual DC/DC converter currents. When the real-time interpolator 426 receives the low voltage regulator command $i_{LV}^{reg}$ from the low voltage regulator 424, the real-time interpolator 426 selects the pre-determined set of individual DC/DC converter currents that correspond or match the low voltage regulator command $i_{LV}^{reg}$.

The output from the real-time interpolator 426 is the final current commands $i_{ij}^{des,final}$ for each of the DC/DC converters 204 to achieve the state of charge using the high voltage currents. The final current commands $i_{ij}^{des,final}$ are the final current command respectively provided to each individual DC/DC converter 204 after interpolation. As illustrated in a graph 600 in FIG. 6, the MPC 420 provides the known optimal solution of the individual currents $i_{ij}$ for several selected low voltage regulator currents $i_{LV}^{reg}$, as the intermediate current commands $i_{ij}^{des}$ for each individual DC/DC converter 204; as such, the real-time interpolator 426 interpolates, for example, between X and Y values for the low voltage regulator current $i_{LV}^{reg}$, in order to obtain the final current commands $i_{ij}^{des,final}$ if the present low voltage regulator current $i_{LV}^{reg}$ received from the low voltage regulator 424 is between the X and Y values. The final current commands $i_{ij}^{des,final}$ drive the DC/DC converters 204 such that output (regulated) current $i_{ij}(V_j/V_{LV})$ to the low voltage battery 208 is equal to $i_{ij}^{des,final}(V_j/V_{LV})$. The term $i_{ij}(V_j/V_{LV})$ denotes the regulated electrical current respectively output from each DC/DC converter 204 to the low voltage battery 208, where $V_j$ is the voltage at an individual DC/DC converter on the high side and $V_{LV}$ is the voltage on the low side. Each high voltage battery module 202 outputs its own current $i_{ij}$ to balance the states of charge as determined by the MPC 420. For example, in FIG. 6 there are assumed to be three high voltage battery modules 202 each controlled by their own DC/DC converter 204. The x-axis is the low voltage regulator current $i_{LV}^{reg}$ while the y-axis is the high voltage currents $i_{ij}$ needed to fulfill the known optimal solution calculated by the MPC 420 to balance the states of charge for the high voltage battery modules 202. After the MPC 420 determines currents $i_{ij}$ to balance the state of charge in different optimal solutions (depicted along the three curves) for various low voltage regulator currents $i_{LV}^{reg}$ including the values X and Y, the real-time interpolator 426 is configured to receive the corresponding intermediate optimal current commands hides from the MPC 420 and receive the present low voltage regulator current $i_{LV}^{reg}$ from the low voltage regulator 424. Assuming the present low voltage regulator current $i_{LV}^{reg}$ is a value between values X and Y, the real-time interpolator 426 interpolates the value of the low voltage regulator current $i_{LV}^{reg}$ between X and Y and uses the corresponding values for high voltage currents $i_{ij}^{des}$ on the three curves in the graph 600 to meet the balanced states of charge. As such, the real-time interpolator 426 issues the final current commands $i_{ij}^{des,final}$ to the DC/DC converters 204 to cause the high voltage battery modules 202 to meet the corresponding states of charge of the known optimal solution.

The MPC 420 has to provide the known optimal solution of the individual high voltage currents $i_{ij}$ for several selected low voltage regulator currents $i_{LV}^{reg}$, because the values of the low voltage regulator current $i_{LV}^{reg}$ from low voltage regulator 424 are determined must faster in the fast loop 552 versus the slow loop 550 that provides the intermediate current commands $i_{ij}^{des}$.

As further details regarding the MPC 420, the MPC 420 incorporates quadratic programming (QP) that is the process of solving certain mathematical optimization problems involving quadratic functions. Specifically, the MPC 420 seeks to optimize (e.g., minimize) a multivariate quadratic function subject to linear constraints on the variables to determine the high voltage currents for the high voltage battery module 202.

The following is the MPC formulation when the number of high voltage battery module is three:

$q_1(k+1)=q_1(k)-h_{HV}(i_{i1}(k)+i_{HV}(k))T,$ $q_2(k+1)=q_2(k)-h_{HV}(i_{i2}(k)+i_{HV}(k))T,$ and $q_3(k+1)=q_3(k)-h_{HV}(i_{i3}(k)+i_{HV}(k))T,$ where $q_1$ (k) is present state of charge for the first high voltage battery module that comprises high voltage batteries, $q_2$ (k) is present state of charge for the second high voltage battery module, $q_3$ (k) is present state of charge for the third high voltage battery module, and $h_{HV}$ is equal to 1/capacity (in amperes*sec) of a high voltage battery module. The $i_{i1}(k)$ is the high voltage current that flows to the first DC/DC converter from the first high voltage battery module, $i_{i2}(k)$ is the high voltage current that flows to the second DC/DC converter from the second high voltage battery module, $i_{i3}(k)$ is the high voltage current that flows to the third DC/DC converter from the third high voltage battery module. Accordingly, high voltage current $i_{ij}(k)$ is equivalent to high voltage current $i_{ij}$ at time step k. The terms $q_1(k+1)$, $q_2(k+1)$, and $q_3(k+1)$ denote the state of charge of the high voltage battery 1, high voltage battery module 2, and high voltage battery module 3, respectively, at time step k+1.

The $i_{HV}(k)$ is the load current that is commonly shared with all high voltage battery modules 202. T is the time period in seconds (s) that the state of charge is sampled. For example, the next state of charge of the first high voltage battery module is $q_1(k+1)$, which is the state of charge expected after T seconds with the present $q_1(k)$, $i_{i1}(k)$, and $i_{HV}(k)$. The term k represents an increase in time such as the next sample time.

The MPC 420 uses quadratic programming to minimize quadratic costs J over a finite horizon N, for the following:

$$J = \sum_{k=1}^{N}(y(k)+R_u(k)), \text{ where}$$

$$y(k) = K1(q_1(k)-q_2(k))^2 + K2(q_2(k)-q_3(k))^2 + K3(q_3(k)-q_1(k))^2, \text{ and}$$

$$R_u(k) = R \times \sum_{j=1}^{3}i_{ij}^2(k).$$

Ru(k) is the weight on control inputs, which are individual currents of the DC/DC converters. If R (>0) is a big number (assume increasing current of DC/DC converter is expensive in terms of actuation cost), balancing the performance will be degraded showing trade-off between control performance and cost of actuation; thus R can be used as a control knob to adjust trade-off.

K1 is the weight of the error of high voltage battery modules 1 and 2, K2 is the weight of the error of high voltage battery modules 2 and 3, and K3 is the weight of the error of high voltage battery module 3 and 1. Accordingly, in steady state, it is expected that the MPC 420 achieves states of charges $q_1=q_2=q_3$.

$$\sum_{k=1}^{N}(y(k)+R_u(k))$$

is the total cost that includes performance cost (y) and actuation cost ($R_u$). As noted herein, R can be used as a control knob that considers trade-off between performance and actuation cost. The term k is time.

In the quadratic programming to minimize quadratic costs, the following sums the input current output to each of the DC/DC converters:

$$\sum_{j=1}^{3}(i_{ij}(k)).$$

In the unidirectional DC/DC converters 204, the MPC 420 and real-time interpolator 426 are configured to maintain $$\sum_{j=1}^{3}(i_{ij}(k)) = i_{LV}^{reg}(k);$$

since the low voltage regulator current $i_{LV}^{reg}(k)$ is generated too fast for the MPC 420, the MPC 420 provides several (sets of) different values of individual currents $i_{ij}(k)$ (equivalent to individual currents $i_{ij}$ at time step k) for different values of $i_{LV}^{reg}(k)$, all of which is output as the intermediate current commands $i_{ij}^{des}$. This allows the real-time interpolator 426 to interpolate over the several values $i_{LV}^{reg}(k)$ to obtain the corresponding individual currents $i_{ij}$ that balance the state of charge and input to the DC/DC converters 204. In one or more exemplary embodiments, the input to the DC/DC converters may correspond to bias currents/bias voltages and/or control bias current/bias voltages.

Additionally, the MPC 420 performs the following:

$$\max(-i_1^{max}+i_{HV}(k),0) \le i_{i1}(k) \le \min(-i_1^{min}+i_{HV}(k), i_{DC}^{max}(k)),$$

$$\max(-i_2^{max}+i_{HV}(k),0) \le i_{i2}(k) \le \min(-i_2^{min}+i_{HV}(k), i_{DC}^{max}(k)), \text{ and}$$

$$\max(-i_3^{max}+i_{HV}(k),0) \le i_{i3}(k) \le \min(-i_3^{min}+i_{HV}(k), i_{DC}^{max}(k)).$$

One or more exemplary embodiments may provide various technical solutions and benefits. Technical solutions and benefits may include automatic control of a distributed low voltage system with control knobs, real-time constraints on electrical current control to avoid malfunction of the system, active state of charge balancing through optimal distribution of electrical current command to DC/DC converters. One or more exemplary embodiments can minimize coupling between the MPC and the low voltage regulator, provide MPC constraint change for optimal efficiency current adjustment, and provide MPC weight change for load division between DC/DC converters. Further, one or more exemplary embodiments provide a control strategy that regulates the input and/or output ports of the converters differentially through a thermal or electrical constraint, and that distributes electrical currents of DC/DC converters to minimize cell-state imbalance with strict constraints for malfunction avoidance. In accordance with one or more exemplary embodiments, a fast-loop low voltage regulator minimizes low voltage deviation due to load current. One or more exemplary embodiments provide real-time interpolation of optimal electrical current of individual DC/DC converters for the current demand from the low voltage regulator, provide real-time generation of constraints for malfunction avoidance, and provide adjustable constraints for always top or always bottom module balancing.

Figure 7:
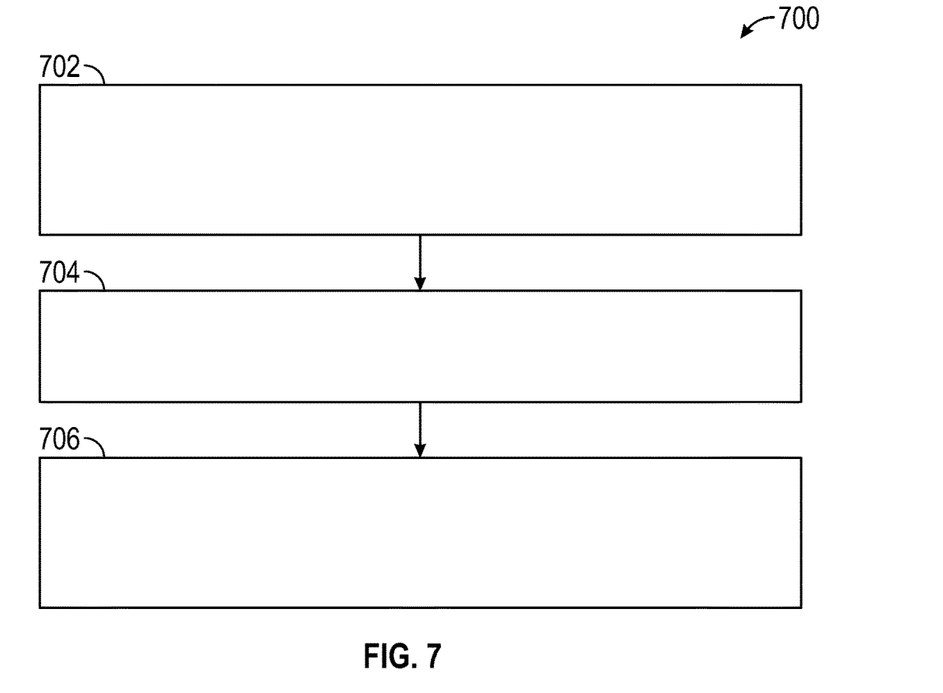
FIG. 7 is a flowchart illustrating a method for providing an optimal control strategy for a distributed low voltage system with unidirectional DC/DC converters in accordance with an exemplary embodiment.

FIG. 7 is a flowchart of a method 700 for providing an optimal control strategy for a distributed low voltage system with unidirectional DC/DC converters in accordance with an exemplary embodiment. Reference can be made to any of the figures discussed herein.

At block 702, the control system 402 is configured to calculate electrical currents that balance states of charge in high voltage battery modules 202 based on a plurality of (potential) values for a low voltage regulator electrical current, in advance to knowing a value for the low voltage regulator electrical current. At block 704, the control system 402 is configured to interpolate the balancing electrical currents in response to receiving the value for the low voltage regulator electrical current, the value received being one of the plurality of (potential) values. For example, FIG. 6 illustrates various values for the low voltage regulator electrical current for which various balancing electrical currents have been calculated by the MPC 420. Once the actual value of the voltage regulator electrical current is known, the real-time interpolator 426 interpolates the balancing electrical currents calculated by the MPC 420 and the interpolated balancing currents-could be balancing electrical currents corresponding to the voltage regulator electrical current having a value that is between X and Y in FIG. 6. At block 706, the control system 402 is configured to differentially vary and/or cause the differential variation of electrical currents input to DC/DC converters 204 in order to balance states of charge in the high voltage battery modules 202 in accordance with the balancing electrical currents interpolated.

In one or more exemplary embodiments, differentially varying the electrical currents input to the DC/DC converters comprises differentially drawing the electrical currents from the high voltage battery modules in order to balance the states of charge in the high voltage battery modules. Differentially varying the electrical currents input to the DC/DC converters in order to balance states of charge in the high voltage battery modules is based on the value of the low voltage regulator electrical current. Selecting the balancing electrical currents is according to the value of the low voltage regulator electrical current based on interpolating the balancing electrical currents at the value, prior to receipt of the value for the low voltage regulator electrical current.

The control system 402 is configured to use a known optimal solution to generate the balancing electrical currents based on the plurality of (potential) values for the low voltage regulator electrical current, prior to receipt of the value for the low voltage regulator electrical current. The control system 402 is configured to balance the states of charge for the high voltage battery modules by individually changing the electrical currents drawn from the high voltage battery modules according to the known optimal solution and the value of the low voltage regulator electrical current. The value of the low voltage regulator electrical current is received from a low voltage regulator 424.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to switching between operating modes. The computer system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle system comprising:
   direct current to direct current (DC/DC) converters configured to regulate high electrical voltages from high voltage battery modules and output regulated electrical currents to a low voltage battery; and
   a control system coupled to the DC/DC converters, the high voltage battery modules, and the low voltage battery, wherein the control system is configured to differentially vary electrical currents input to the DC/DC converters in order to balance states of charge in the high voltage battery modules, by:
      calculating sets of the electrical currents that balance the states of charge in the high voltage battery modules based on a plurality of values for a low voltage regulator electrical current, in advance to knowing a value for the low voltage regulator electrical current;
      interpolating the sets of the electrical currents to be input to the DC/DC converters in response to receiving the value for the low voltage regulator electrical current, the value received being one of the plurality of values; and
      in response to interpolating, selecting an interpolated set of the electrical currents from the sets of the electrical currents as input to the DC/DC converters in accordance with the value received, thereby causing the DC/DC converters to output regulated electrical currents to the low voltage battery.

2. The vehicle system of claim 1, wherein the control system is configured to cause the DC/DC converters to differentially draw the electrical currents from the high voltage battery modules in order to balance the states of charge in the high voltage battery modules.

3. The vehicle system of claim 1, wherein the control system differentially varies the regulated electrical currents output from the DC/DC converters to balance the states of charge in the high voltage battery modules based on the value of the low voltage regulator electrical current.

4. The vehicle system of claim 1, wherein the control system is configured to select the interpolated set of the electrical currents according to the value of the low voltage regulator electrical current based on interpolating the sets of the electrical currents at the value in order to find the interpolated set, in response to receipt of the value for the low voltage regulator electrical current.

5. The vehicle system of claim 1, wherein the control system is configured to use a known optimal solution to dictate the sets of the electrical currents for the DC/DC converters based on the plurality of values for the low voltage regulator electrical current, prior to receipt of the value for the low voltage regulator electrical current.

6. The vehicle system of claim 5, wherein the control system is configured to balance the states of charge for the high voltage battery modules by individually changing the electrical currents drawn from the high voltage battery modules through the DC/DC converters according to the known optimal solution and the value of the low voltage regulator electrical current.

7. The vehicle system of claim 1, wherein the control system is configured to receive the value of the low voltage regulator electrical current from a low voltage regulator.

8. A method comprising:
   calculating sets of electrical currents that balance states of charge in high voltage battery modules based on a plurality of values for a low voltage regulator electrical current, in advance to knowing a value for the low voltage regulator electrical current;
   interpolating the sets of the electrical currents in response to receiving the value for the low voltage regulator electrical current, the value received being one of the plurality of values; and
   in response to interpolating, selecting an interpolated set of the electrical currents from the sets of the electrical currents as input to direct current to direct current (DC/DC) converters in accordance with the value received, thereby causing the DC/DC converters to output regulated electrical currents to a low voltage battery.

9. The method of claim 8, further comprising differentially varying the regulated electrical currents output from the DC/DC converters to the low voltage battery by differentially drawing the interpolated set of the electrical currents from the high voltage battery modules in order to balance the states of charge in the high voltage battery modules.

10. The method of claim 8, further comprising differentially varying the regulated electrical currents output from the DC/DC converters to the low voltage battery in order to balance the states of charge in the high voltage battery modules based on the value of the low voltage regulator electrical current.

11. The method of claim 8, further comprising selecting the interpolated set of the electrical currents to be input to the DC/DC converters according to the value of the low voltage regulator electrical current based on interpolating the sets of the electrical currents at the value in order to find the interpolated set, in response to receipt of the value for the low voltage regulator electrical current.

12. The method of claim 8, further comprising using a known optimal solution to generate the sets of the electrical currents for the DC/DC converters based on the plurality of values for the low voltage regulator electrical current, prior to receipt of the value for the low voltage regulator electrical current.

13. The method of claim 12, further comprising balancing the states of charge for the high voltage battery modules by individually changing the electrical currents drawn from the high voltage battery modules through the DC/DC converters according to the known optimal solution and the value of the low voltage regulator electrical current.

14. The method of claim 8, wherein the value of the low voltage regulator electrical current is received from a low voltage regulator.

15. A vehicle system comprising:
a memory having computer readable instructions; and
a processing device for executing the computer readable instructions, the computer readable instructions controlling the processing device to perform a method including:
calculating sets of electrical currents that balance states of charge in high voltage battery modules based on a plurality of values for a low voltage regulator electrical current, in advance to knowing a value for the low voltage regulator electrical current;
interpolating the sets of the electrical currents in response to receiving the value for the low voltage regulator electrical current, the value received being one of the plurality of values; and
in response to interpolating, selecting an interpolated set of the electrical currents from the sets of the electrical currents as input to direct current to direct current (DC/DC) converters in accordance with the value received, thereby causing the DC/DC converters to output regulated electrical currents to a low voltage battery.

16. The vehicle system of claim 15, wherein the processing device is configured to perform the method further comprising differentially varying the regulated electrical currents output from the DC/DC converters to the low voltage battery by differentially drawing the interpolated set of the electrical currents from the high voltage battery modules in order to balance the states of charge in the high voltage battery modules.

17. The vehicle system of claim 15, wherein the processing device is configured to perform the method further comprising differentially varying the regulated electrical currents output from the DC/DC converters to the low voltage battery in order to balance the states of charge in the high voltage battery modules based on the value of the low voltage regulator electrical current.

18. The vehicle system of claim 15, wherein the processing device is configured to perform the method further comprising selecting the interpolated set of the electrical currents to be input to the DC/DC converters according to the value of the low voltage regulator electrical current based on interpolating the sets of the electrical currents at the value in order to find the interpolated set, in response to receipt of the value for the low voltage regulator electrical current.

19. The vehicle system of claim 16, wherein the processing device is configured to perform the method further comprising using a known optimal solution to generate the sets of the electrical currents for the DC/DC converters based on the plurality of values for the low voltage regulator electrical current, prior to receipt of the value for the low voltage regulator electrical current.

20. The vehicle system of claim 19, wherein the processing device is configured to perform the method further comprising balancing the states of charge for the high voltage battery modules by individually changing the electrical currents drawn from the high voltage battery modules through the DC/DC converters according to the known optimal solution and the value of the low voltage regulator electrical current.

* * * * *